Oct. 4, 1966  G. HARRIS  3,276,418
TACHOMETER DIAL FACE FOR SPEEDOMETER
Filed April 8, 1965
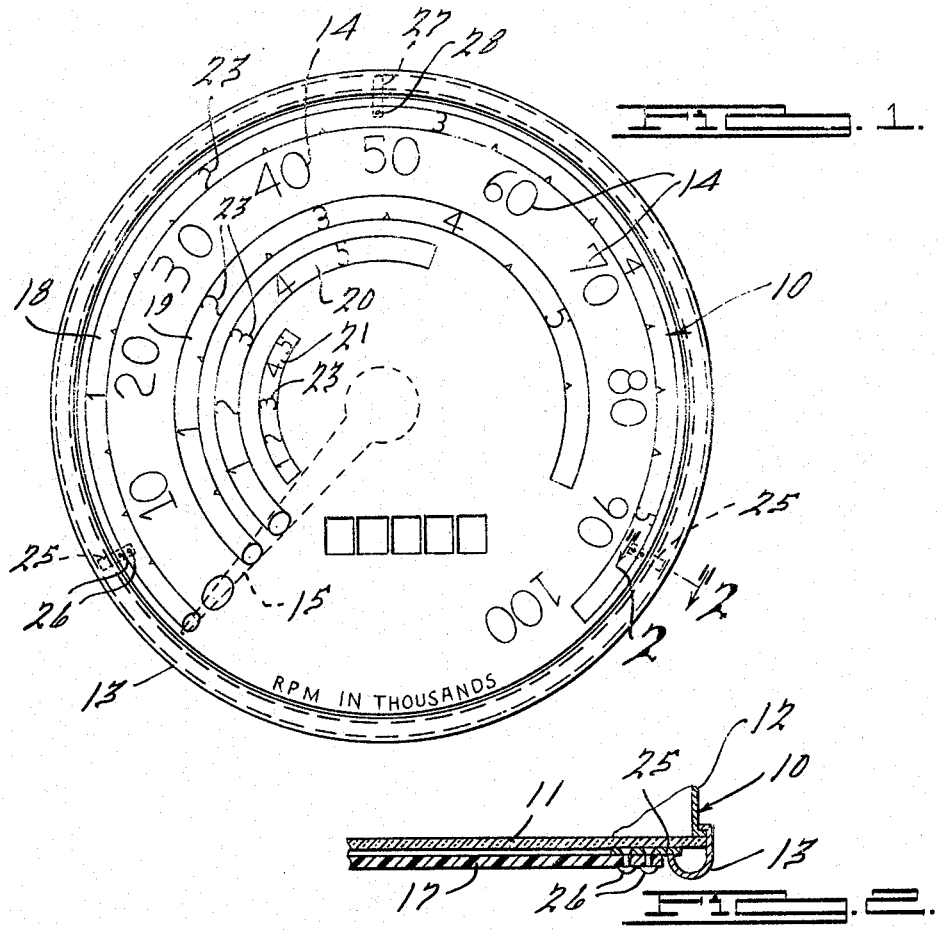
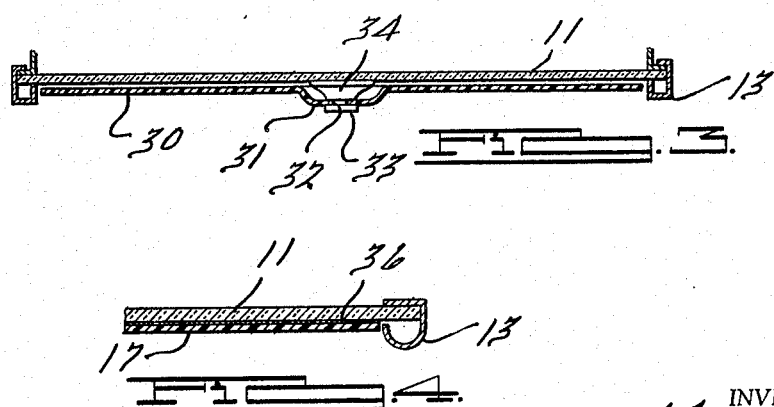
INVENTOR.
Gerald Harris
BY
ATTORNEYS.

United States Patent Office 3,276,418
Patented Oct. 4, 1966

3,276,418
TACHOMETER DIAL FACE FOR SPEEDOMETER
Gerald Harris, 8015 Anges, Detroit, Mich.
Filed Apr. 8, 1965, Ser. No. 446,670
4 Claims. (Cl. 116—116)

This invention relates to tachometer dials and particularly to a tachometer dial which is supported upon a speedometer of an automotive vehicle.

Speedometers for automotive vehicles provide a dial face having readings in miles or kilometers per hour, and thereby provide indications of the speed at which the vehicle is traveling on the highway. It is often desirable to know the engine speed at which the car is being driven for more efficient operation. Especially is this true in hand shift transmissions having three or more speeds permitting the driver to know at a glance at the speedometer face the speed at which the engine is running as well as the speed at which the vehicle is being operated in miles or kilometers per hour. To this end the tachometer dial face is constructed in a manner to be securable to the face of the speedometer leaving the indications of miles or kilometers per hour clearly visible therethrough, while providing the tachometer indications for each of the different transmission speeds at which the engine may be driven. The dial may be attached by fingers which extend under the trim ring extending over the edge of the speedometer case or may be adhered to the glass within the ring or releasably secured thereon by a suction cup or the like.

The scales for the different transmission speeds are provided for the particular car to which the dial face is to be provided so that in any particular speed indication will be given by the speedometer dial of the speed at which the engine is rotating and the speed at which the vehicle is driven.

Accordingly, the main objects of the invention are: to provide a dial face for a speedometer which has indications for the speed at which the engine is rotating at the speed at which the vehicle is traveling as shown on the speedometer; to provide a dial face having tachometer indications thereon which is readily attachable to the dial face of a speedometer; to provide a dial face for the face of a speedometer which adds the indications for the engine speed while maintaining the indications for the car speed visible therethrough, and in general to provide a dial face having tachometer indications thereon which is simple in construction, easy of application and economical manufacture.

Other objects and features of novelty of the invention will be specifically pointed or will become apparent when referring, for a better understanding of the invention, to the following description taken in conjunction with the accompanying drawing, wherein:

FIGURE 1 is a plan view of a tachometer dial applied to a speedometer transparent closure face embodying features of the present invention;

FIG. 2 is an enlarged broken sectional view of the structure illustrated in FIG. 1, taken on the line 2—2 thereof;

FIG. 3 is a sectional view of a speedometer transparent closure face having a tachometer dial applied thereto showing another form of attachment, and FIG. 4 is a view of structure, similar to that illustrated in FIG. 2, showing a still further form of attaching means for the tachometer dial.

In FIGS. 1 and 2, a speedometer 10 is illustrated having a transparent closure face 11 secured to the tachometer case 12 by a trim ring 13. The closure face 11 covers a dial face 14 which has indicating numbers 0 to 100 for designating the speed at which the vehicle is traveling, an indicating hand 15 moves across the face 14 and indicates to the vehicle operator the speed at which in miles or kilometers per hour the vehicle is traveling.

The present invention covers the employment of a tachometer dial face 17, which is made from transparent material and provided with bands 18, 19, 20 and 21, having indicating numbers 23 thereon which designate the engine speed in revolutions per minute in each band as the hand 15 moves to indicate the speed of operation of the vehicle. The bands 18, 19, 20 and 21 correspond to the four transmission speeds, the fourth, the third, the second and the first or low speed, respectively. Thus, for example, it will be noted that when the indicating hand 15 points to the numeral 20 of the speedometer dial appraising the driver that the vehicle is traveling at a speed of 20 miles per hour, in low gear the engine will be traveling at approximately 3500 r.p.m., in second gear approximately 2500 r.p.m., in third gear approximately 1500 r.p.m., while in high gear the engine would be traveling at approximately 1000 r.p.m. With the use of a tachometer dial face, the operator is appraised instantly of the speed of rotation of the engine in any particular transmission drive relative to the speed at which the vehicle is traveling over the ground.

The tachometer dial face 17 has two fingers 25 disposed 120° apart fixedly secured to the edge by a pair of rivets 26. A third finger 27 120° from the first two fingers 25 is secured by a single rivet 28 to the edge of dial face 17. After the fingers 25 are inserted beneath the trim ring 13, the dial face 17 is moved against the closure face 11 and the finger 27 is moved to radial position, as illustrated in FIG. 1 to retain the dial face in firm fixed relation to the speedometer. It will be noted in this arrangement that a space has been left between the tachometer indicating bands 18 and 19 for the numbers on the speedometer dial face of 0 to 100, which indicates the speed in miles or kilometers per hour at which the automobile is driven. As pointed out hereinabove, the indications on the tachometer band are in thousands of revolutions and this is printed at the bottom of the dial as "r.p.m. in thousands."

In FIG. 3, a tachometer dial face 30 is the same as the dial face 17 illustrated and described above with regard to FIGS. 1 and 2, with the exception that the dial face 30 has a central embossed section 31 containing an aperture 32. A head 33 of a suction cup 34 extends through aperture 30 and supports the suction cup 34 at the center of the dial face. The suction cup is pressed against the center of the speedometer closure face 11 and retains the dial face 30 in firm fixed relation thereto. Preferably, the aperture 32 is of D-shaped to prevent the dial face 30 from rotating on the suction cup 34 after it has been secured to the closure face 11.

In FIG. 4, another manner for attaching the tachometer dial face 17 to the closure face 11 of the speedometer is illustrated. In this arrangement, a transparent adhesive material 36 secures the dial face 17 to the speedometer closure face 11 in firm fixed relation thereto. It is within the purview of the invention to have a dial face 17 with the adhesive 36 thereon formed as a decalcomania and in which arrangement it is only necessary to wet the backing sheet in water and thereafter slide it from the dial face 17 while maintaining the dial face in proper position relative to the speedometer closure face 11. Irrespective of how the tachometer dial face is attached to the closure face 11, the speedometer readings will be clearly visible along with the readings on the tachometer bands which correspond to the different speeds at which the engine and automobile is driven.

What is claimed is:

1. A tachometer dial face made of transparent material having spaced scales calibrated to indicate engine revolutions per minute corresponding to the engine speed in each of a multiple transmission gear ratios, and means for securing the tachometer dial face over the transparent closure face of a speedometer, the scale of the speedometer indicating the vehicle speed being offset from the scales of the tachometer dial face and being clearly visible therethrough.

2. A tachometer dial face as recited in claim 1, wherein said securing means embodies a pair of fixed fingers extending from the tachometer dial face and a pivoted finger mounted thereon, the speedometer having the closure face supported by a trim frame beneath which the fingers extend.

3. A tachometer dial face as recited in claim 1, wherein said securing means embodies a suction cup fixed to the center of the tachometer dial face.

4. A tachometer dial face as recited in claim 1, wherein said securing means embodies an adhesive.

References Cited by the Examiner

UNITED STATES PATENTS

| | | | |
|---|---|---|---|
| 960,946 | 6/1910 | Jones | 116—129 |
| 1,417,049 | 5/1922 | Farmer | 235—103.5 |
| 2,175,129 | 10/1939 | Ralfson | 116—57 |
| 2,635,357 | 4/1953 | Whitlock | 35—39 |
| 2,702,520 | 2/1955 | Helgeby | 73—495 |
| 2,711,153 | 6/1955 | Wendt | 116—57 |
| 3,138,137 | 6/1964 | Hubner | 116—129 |
| 3,162,173 | 12/1964 | Morgan et al. | 116—129 |

LOUIS J. CAPOZI, *Primary Examiner.*